Feb. 21, 1933.   R. R. TEETOR   1,898,323
HANDLE FOR FISHING RODS
Filed Oct. 31, 1930
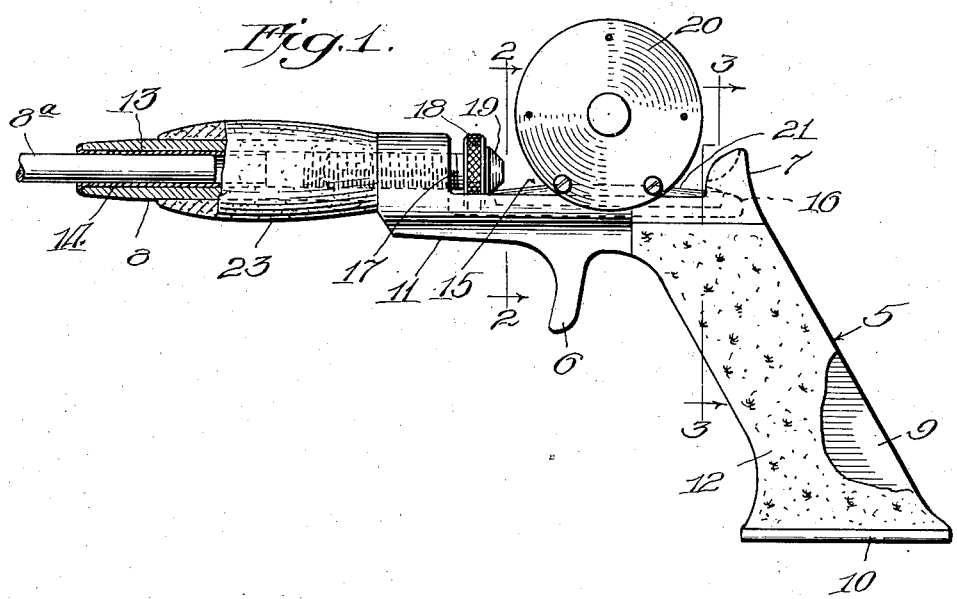
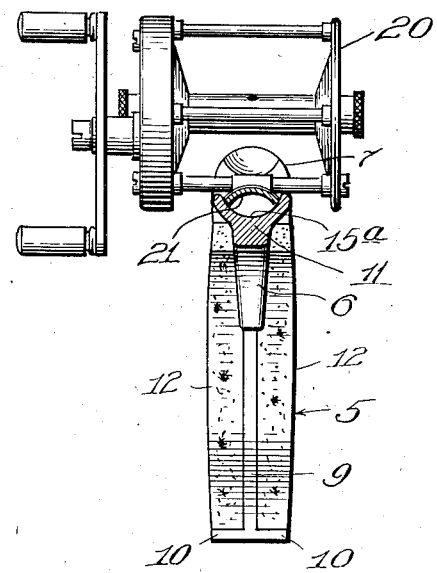
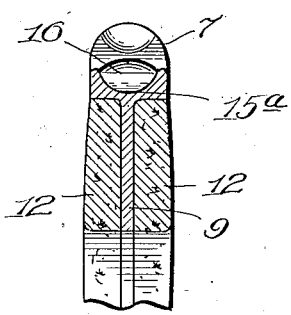
Inventor:
Ralph R. Teetor
By Rector, Hibben, Davis and Macauley
Attys Patented Feb. 21, 1933

1,898,323

UNITED STATES PATENT OFFICE

RALPH R. TEETOR, OF HAGERSTOWN, INDIANA

HANDLE FOR FISHING RODS

Application filed October 31, 1930. Serial No. 492,384.

My invention relates to handles for fishing rods.

The principal object of my invention is to provide a fishing pole handle which comfortably fits the fisherman's hand in a natural and effortless position and permits a convenient and easy manipulation of the reel by the thumb of the hand while it is firmly gripping the handle. More particularly, the fishing pole handle is formed in the shape of a pistol and has a deep depression in the top edge permitting the reel to be mounted low on the handle.

Another object of my invention is to provide improved means for securing the reel on the handle, the means being simple and cheap in construction, easy of operation and positive in action, while at the same time it readily accommodates reels having bases of different sizes.

The invention will be better understood by referring to the accompanying drawing in which :—

Fig. 1 is a side plan view of the fishing pole handle embodying my invention and with the reel applied;

Fig. 2 is a sectional view taken on the line 2—2 of Fig. 1; and

Fig. 3 is a fragmentary section taken on the line 3—3 of Fig. 1 with the reel removed.

The fishing pole handle comprises a main hand grip portion 5 which extends downwardly and rearwardly, a thumb support 7, a central portion 11 having a forefinger support 6 and a pole supporting end 8. The handle, except for the cork sides 12 of the grip portion 5, is preferably cast of light metal, such as aluminum, or bakelite, or any other similar material. The casting has a plate portion 9 with oppositely extending flanges 10, the portion 9 forming the rigid core of the grip portion 5. The pole supporting end 8 is provided with a bore 13 and mounted in this bore is a brass or bronze tube 14 about which the handle is cast. The end of the fishing pole 8ª is pushed into the brass sleeve 14 and is held therein by the usual friction fit.

The handle is provided with a deep depression 15, the bottom 15ª of which is below the axis of the bore 13 and also substantially below the upper edge of the thumb support 7. The bottom 15ª of the depression is transversely curved downward, as best shown in Figs. 2 and 3. The rear end of the depression is provided with a recess 16 which extends into the thumb support. The upper side of the recess is inclined downwardly and rearwardly and is also transversely curved upwardly. The rear end of the bore 13 is internally threaded to accommodate the threaded end of a thumb screw 17 having a knurled knob 18, and a conical head or end 19.

The reel 20 may be of any standard design and is provided with the usual base support 21 which is transversely curved upward.

When the reel is to be mounted on the handle, the rear edge of its support 21 is thrust into the recess 16, the curvature of the upper wall of which approximates that of the support. The thumb screw 17 is then turned to screw it rearwardly. During this movement the lower side of the conical head 19 engages the forward end of the support 21 which causes the rear end of the support 21 to be forced firmly rearwardly and downwardly in the recess 16 and forward end of the support to be wedged downwardly. I found by experience that this means for securing the reel in position firmly seats the side edges of the reel base 21 against the curved bottom of the depression 15 and rigidly holds the ends of the base 21 in position, without any danger of the reel base turning or becoming loose on the handle. Reels are made with bases 21 of different dimensions and even reels of the same make and size have slightly different sized bases due to inaccuracies of manufacture, but I find that the above structure will accommodate them all with equal facility.

By sinking the base of the reel 21 into the deep depression 15 I find by experience that without inconvenience or releasing a firm grip on the handle the thumb may easily be placed against the line on the reel to control the operation of the reel as when casting or paying out the line.

I have placed over the pole receiving end a handle 23 which is formed of cork or other suitable material. I find this second handle quite convenient as the fisherman may use it at times when he wishes to shorten his grip or when he finds it necessary to employ both hands as when landing a large fish.

It will be seen that my handle is admirably adapted to carry out the objects first above stated. The pole may be conveniently supported by the hand in its natural and unstrained position, without bending the wrist, and at the same time the reel may be readily controlled by the thumb. The reel securing means is simple, cheap, efficient, positive, universal and easy of manipulation.

I claim:

1. In combination, a fishing pole handle shaped in the form of a pistol and having a deep depression in its upper side and provided with a downwardly inclined main handle grip, a thumb support projecting upwardly substantially above the bottom of said depression, and a fishing pole receiving end having a bore for receiving the end of the fishing pole, the axis of the bore being above the bottom of said depression which is to receive the base of a reel, and an adjustable member mounted in said bore for fastening the reel on the handle.

2. In combination, a fishing pole handle shaped in the form of a pistol and having a deep depression in its upper side and provided with a downwardly inclined main handle grip, a thumb support projecting upwardly substantially above the bottom of said depression and having a recess to receive the rear end of the base of the reel, and a pole receiving end having a bore for receiving the end of a fishing pole, the axis of the bore being above the bottom of said depression, and an adjustable member positioned in the depression and supported on said pole-receiving end for forcing the rear end of said base firmly into said recess and forcing the forward end of said base firmly against the bottom of said depression.

3. In combination, a fishing pole handle having a pole receiving end with a bore extending therethrough, the forward end of the bore to receive and support the inner end of the fishing pole, a seat for supporting the base of the reel, and a thumb screw threaded into the rear end of said bore and having a head to engage said base and firmly force and hold said base against said seat, and means at the forward end of said seat for securing the forward end of the base.

4. In combination, a fishing pole handle having a depression with its bottom transversely curved downwardly, a recess at one end of said depression, the upper wall of said recess being inclined longitudinally and transversely curved upwardly, an adjustable screw at the other end of said depression having a conical head, and a reel having a base plate transversely curved upwardly, the side edges of said base engaging the curved bottom of said depression, one end of the base engaging the top wall of said recess, and the other end of the base being engaged by the head of said screw.

5. In combination, a fishing pole handle having a seat for a reel, provided with a base, a projection at one end of said seat having a recess, a projection at the other end of said recess having a longitudinal bore, a thumb screw threaded in said bore and having a conical head to engage the other end of said base to force it downwardly against said seat and also to firmly force said first mentioned end of the base into said recess, the latter being formed to wedge said first mentioned end of said base against said seat.

In testimony whereof, I have subscribed my name.

RALPH R. TEETOR.